Oct. 14, 1952  J. P. BUTTERFIELD  2,614,009
PISTON STRUCTURE
Filed March 24, 1948  4 Sheets-Sheet 1
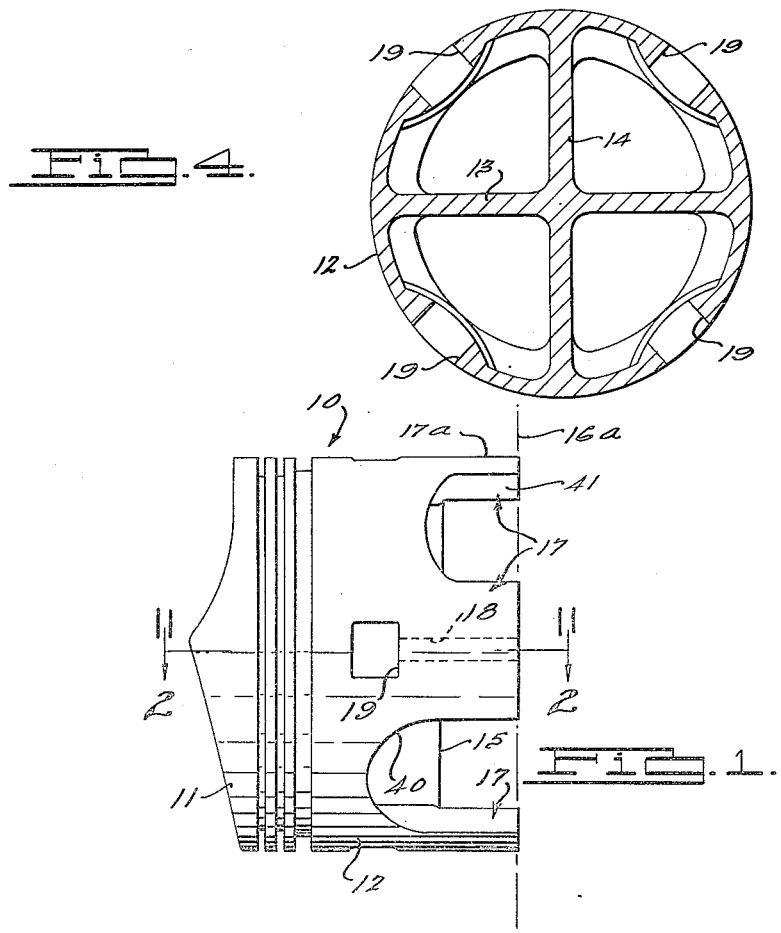
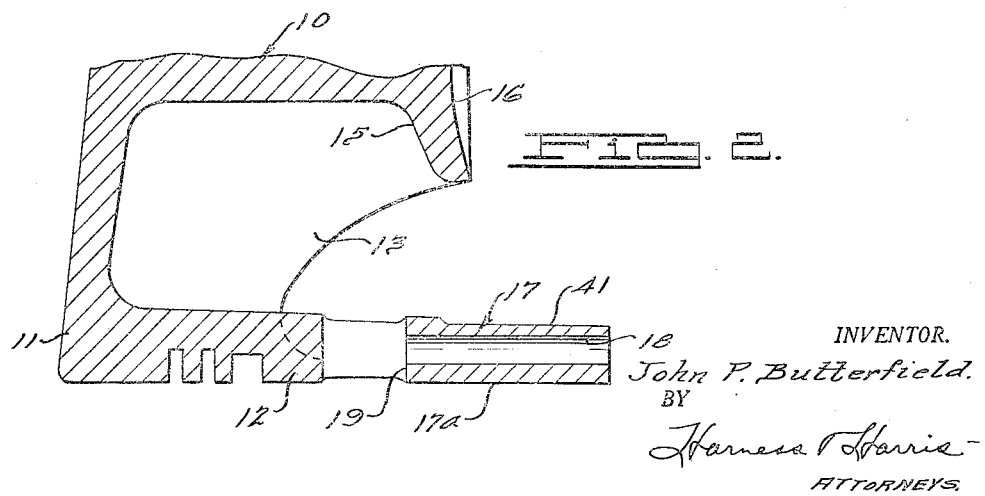
INVENTOR.
John P. Butterfield.
BY
Harness & Harris
ATTORNEYS.

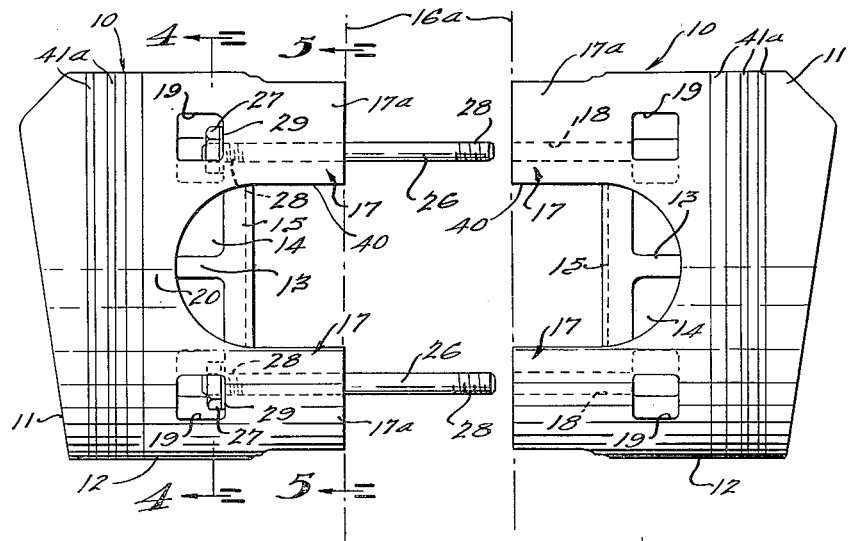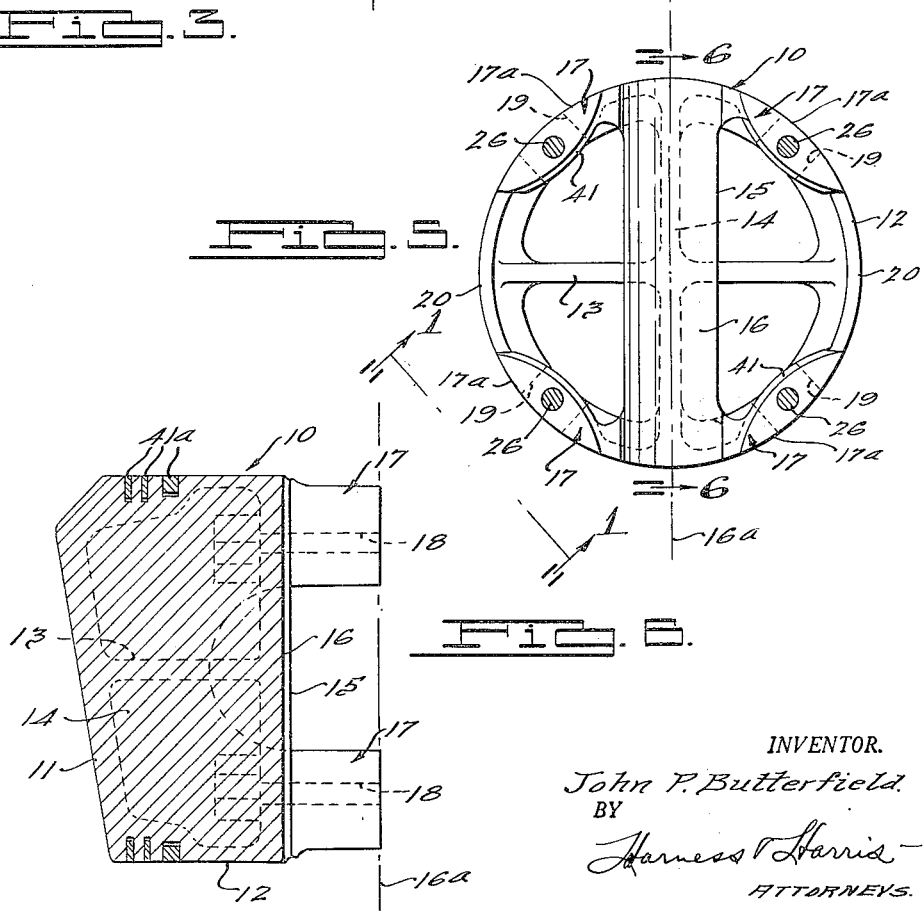

Oct. 14, 1952     J. P. BUTTERFIELD     2,614,009
PISTON STRUCTURE

Filed March 24, 1948     4 Sheets-Sheet 3

INVENTOR.
John P. Butterfield.
BY
Harness & Harris
ATTORNEYS.

Oct. 14, 1952     J. P. BUTTERFIELD     2,614,009
PISTON STRUCTURE
Filed March 24, 1948     4 Sheets-Sheet 4
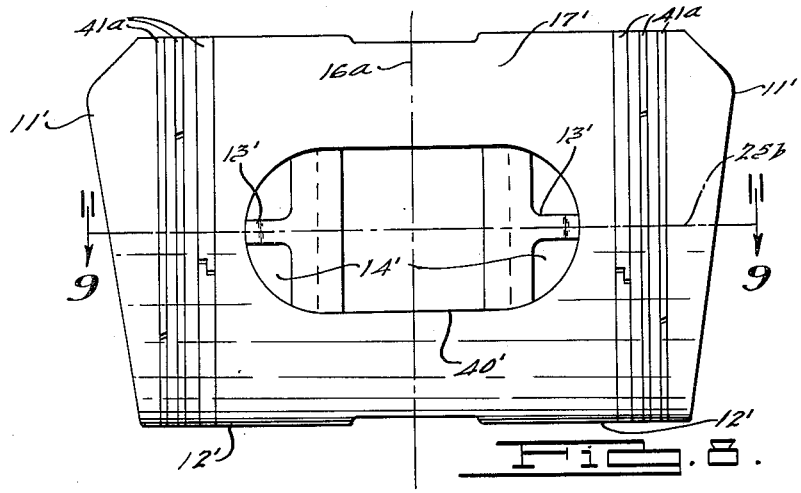
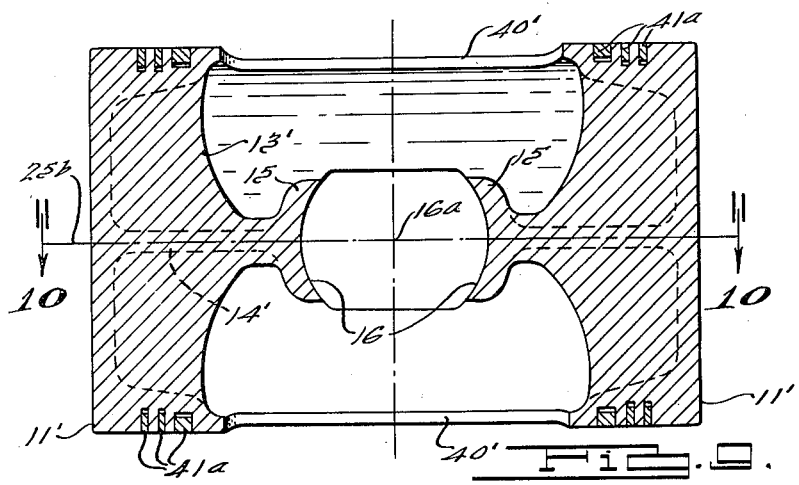
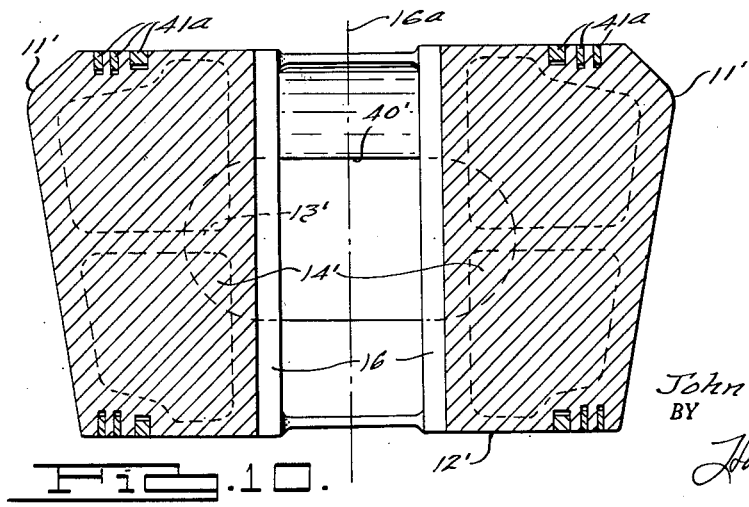
INVENTOR.
John P. Butterfield.
BY
Harness & Harris
ATTORNEYS.

Patented Oct. 14, 1952

2,614,009

UNITED STATES PATENT OFFICE 2,614,009

PISTON STRUCTURE

John P. Butterfield, Grosse Pointe Woods, Mich., assignor to Chrysler Corporation, Highland Park, Mich., a corporation of Delaware Application March 24, 1948, Serial No. 16,649

13 Claims. (Cl. 309—10)

This invention relates to piston structures of the type used in internal combustion engines, and particularly engines or compressors of the double acting type in which a working head is provided at each end of the piston structure.

In engines of the double acting type it is customary to operably connect the piston structure directly to the crank portion of the crankshaft without the use of a connecting rod such as is used in the more conventional single acting types of engines. However, in such arrangements, difficulties have been experienced in providing an arrangement in which undue wear and clearances will not develop between the piston structure and crankshaft and in which the operating parts, including the piston structure, crankshaft, and their connecting parts, will not be subjected to undesired binding due to unavoidable errors in the manufacture and assembly of the engine within the range of tolerances customarily provided.

It is an object of my invention to provide improvements which will avoid or largely overcome the aforesaid past difficulties, the subject invention being directed to an improved piston structure for accomplishing the desired results.

A further object is to provide an improved piston structure provided with a slideway for receiving a crank-mounted bearing block, the slideway having opposed slideway bearing surfaces formed cylindrically about the axis of the slideway as an axis of generation of the slideway bearing surfaces. By reason of such arrangement the bearing block is axially located on the crank portion and the parts capable of a universal self-adjustment to relieve any binding tendencies, the piston structure being free to oscillate slightly to sufficiently relieve such binding tendencies.

My invention, according to certain features thereof including the provision of my improved slideway as a part of the piston structure, may be utilized in a unitary or one-piece type of piston structure or may be utilized in a piston structure of the type formed of several parts and it is accordingly a further object of my invention to provide a piston structure of each of these types capable of providing the aforesaid desired improvements.

In piston structures that are in effect two pistons directly coupled to one another and receiving a crankshaft between them, it is a problem to construct the piston structure in such a way that it and the crankshaft may be readily assembled. This is particularly true if the piston structure is relatively short, which I have found to be desirable in cases where a saving in space occupied by the engine using the piston structure is to be effected.

An additional object of the invention is to provide an improved piston structure employing a plurality of piston parts joined to one another.

A further object is to provide improvements in a piston structure involving opposed pressure faces and receiving a crankshaft extending through the piston structure.

Additional objects and advantages of my invention will be more apparent from the following description of several embodiments of my invention which are illustrative of the principles thereof, reference being made to the accompanying drawings in which:

Fig. 1 is a side elevational view taken from line 1—1 of Fig. 5 of a novel piston part forming part of the present invention;

Fig. 2 is an enlarged sectional view taken on the line 2—2 of Fig. 1;

Fig. 3 is a side view of two piston parts ready to be assembled with respect to one another;

Fig. 4 is a sectional view taken on the line 4—4 of Fig. 3;

Fig. 5 is a sectional view taken on the line 5—5 of Fig. 3;

Fig. 6 is a sectional view taken on the line 6—6 of Fig. 5;

Fig. 8 is an elevational view of a piston structure according to a further embodiment of my invention;

Fig. 9 is a sectional view taken on line 9—9 of Fig. 8;

Fig. 10 is a sectional view taken on line 10—10 of Fig. 9.

Figure 7:
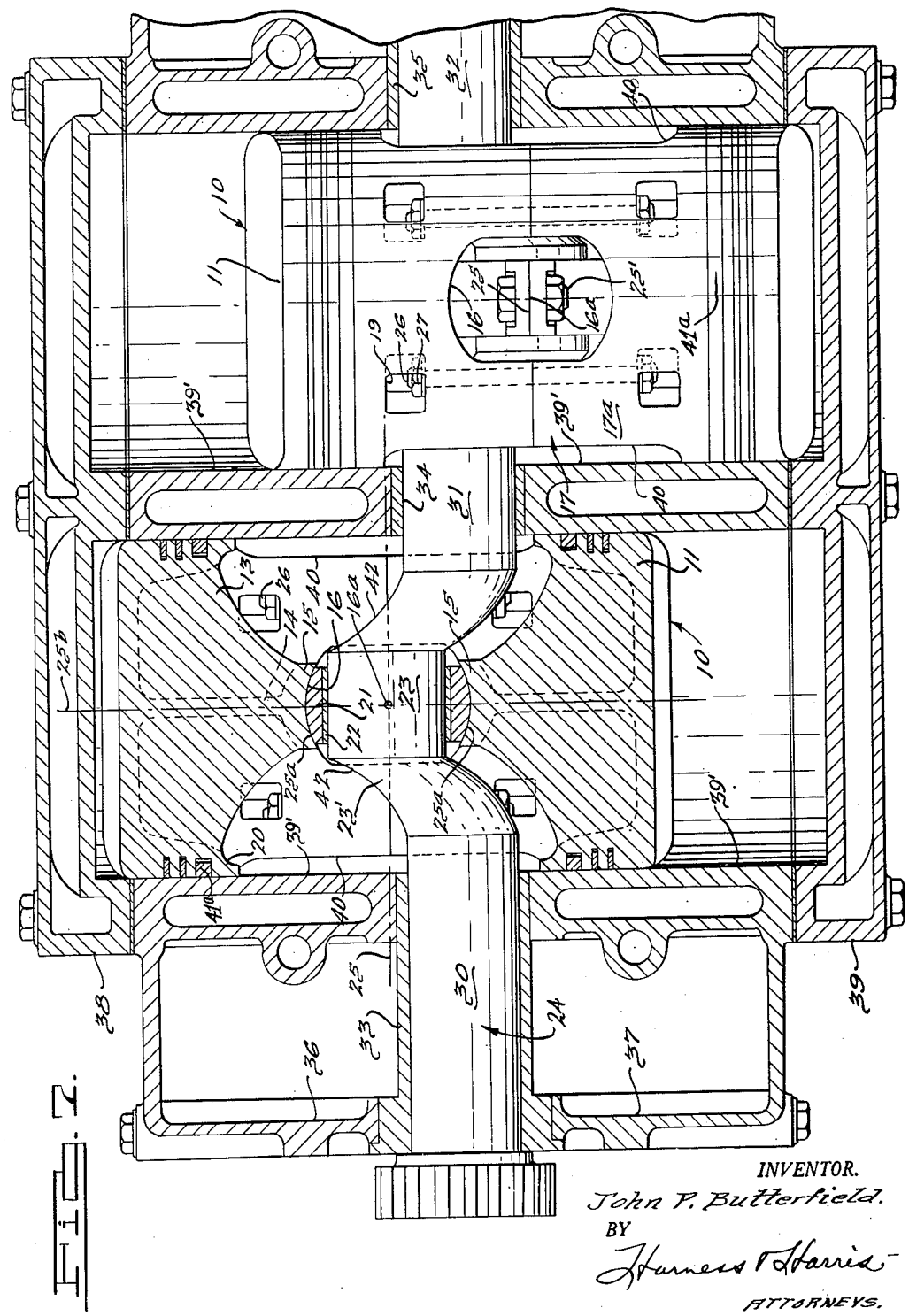
Fig. 7 is a sectional view through an engine employing the novel piston structure of the present invention.

The reference character 10 designates a unitary piston part of a piston structure, such part having a pressure head 11, a skirt 12, intersecting diametrical webs or flanges 13 and 14, extending inwardly from the head and from one side of the skirt to the opposite side, and a slideway portion 15 extending along the flange 14 in spaced relation to the head 11 from one side of the skirt 12 to the other side, the slideway being open outwardly of the skirt. Each of the X-braces formed by the webs 13 and 14 at each end of the piston structure has these webs so arranged that they interconnect a head 11 and skirt 12, and sweep into merging relationship with the slideway as best seen in Figs. 6 and 7. As seen in Figs. 2, 5, and 7, the slideway portion 15 is wider than the flange 14 and is provided with an arcuate cylindrical bearing surface of revolution 16, formed of elements or lines, all of which are parallel to one another and to the slideway axis 16a about which the surface 16 is developed as a portion of a cylindrical surface having its axis at 16a.

The skirt 11 has four projections 17, which, as seen in Fig. 6 are disposed adjacent to and at opposite sides of the ends of the slideway portion 15, and which, as seen in Figs. 2, 3, and 6, extend farther inwardly from the piston head 11 than the slideway portion 15 is spaced therefrom. Each skirt projection 17 has a cylindrical outer face 17a and is provided with a passage 18 extending from the projection end and toward the piston head and terminating at a region spaced therefrom at which is provided a recess or opening 19 in the piston skirt. These projections 17 provide the intermediate body portion or intermediate connecting structure of the whole piston structure when the main component parts 10 thereof are assembled. Regions 20 of the skirt at opposite sides of the slideway portion 15 between the projections 17 extend inwardly from the piston head 11 a less distance than the slideway portion 15 is spaced from the piston head. As seen in Fig. 7, the depth of the flange 13 varies so as to have a minimum adjacent skirt 12 somewhat less than the length of the skirt region 20 and a maximum adjacent the slideway portion 15 so that the flange 13 merges with the slideway portion. The flange 14 also merges with the slideway and extends transversely to flange 13 between the head 11 and skirt 12. Flanges 13 and 14 provide an X-brace stiff support for the slideway rigidly connecting the head, skirt, and slideway while providing a light weight piston structure.

The illustrated piston head 11 has a pressure surface that has portions angularly related to one another although, if desired, other shapes of pressure surfaces may be used as desired.

The piston part 10, just described, is adapted, as shown in Fig. 7, to be secured to a similar piston part 10 with the skirt projections 17 of one piston part abutting those of the other piston part and the slideway portions 15 embracing a bearing block or a slide head 21, in which is mounted a bushing 22, in which an offset crank portion 23 of a crankshaft structure 24 is journalled. For convenience of assembly the slidehead is formed in halves meeting along a plane 25. The bearing block halves are secured together at their opposite sides by suitable means 25' shown in Fig. 7. Each slidehead half has an arcuate cylindrical surface portion 25a which matches and slides along the arcuate cylindrical surface 16 in one piston part 10. The bushing 22 is also formed in halves so that like the slidehead 21 it may be easily assembled on the crankshaft portion 23.

The plane 25 contains the slideway axis 16a and also the axis of the crank portion 23 such that the slideway axis 16a is normal or perpendicular to the axis of the crank portion 23. Furthermore the plane 25 is normal to the axis 25b of the engine cylinder and piston structure as shown in Fig. 7. The three axes 25b, 16a, and the axis of crank portion 23 intersect at a common point within the slideway and within the bearing block 21 when the piston structure is at its two extreme positions of movement, one being shown in Fig. 7.

It will be understood that when the piston parts are assembled, the two cylindrical bearing surfaces 16 have a common axis 16a which is also the axis about which the cylindrical bearing block surfaces 25a are formed. The bearing block 21 is axially slidable on the crank portion 23 and is, therefore, free to adjust itself in relation to the crank and piston. Inasmuch as the bearing block 21 is freely slidable in the direction of axis 16a and since the piston structure can oscillate or tilt slightly about the crank pin 23 within the cylinder bore 39' it will be apparent that any minor misalignments or deflections of the crankshaft, crank portion, piston, cylinder bore, or bearing block, are fully compensated for by the ability of these parts to freely adjust themselves in universal fashion as more fully described and claimed in my copending application Serial No. 16,648 filed March 24, 1948.

It will be apparent that each of the bearing surfaces 16 of the slideway is cylindrically curved in planes normal or perpendicular to the slideway axis 16a.

The piston parts 10 are held in assembled relation by four tension members or bolts 26 and eight nuts 27. Each bolt is positioned in a passage 18 in one piston part 10 and in the passage 18 aligned with the aforesaid passage in the other piston part 10 and has threaded ends 28 projecting into the openings 19 in the piston skirts 11. The nuts 27 are inserted in the openings 19 and applied to the threaded ends 28 until they are drawn up tight against washers 29 acting against the bases of the openings 19. The pressure heads 11 are thus tied together by tension tie members in the form of bolts 26 embedded in the structure 17 intermediate the opposite ends of the assembled piston structure. The provision of the two main component similar piston parts 10 facilitates assembly of the double-headed piston structure resulting from mounting the two piston parts on the same portion of crankshaft 24.

The crankshaft has axial portions 30, 31, and 32 journalled respectively, in bearing 33, 34, and 35 supported in blocks 36 and 37, having cylinders 39', in which the pistons reciprocate. Heads 38 and 39 are secured to the cylinder blocks 36 and 37, respectively. The blocks 36 and 37 are bolted together in face contact in a plane through the crankshaft axis normal to axis 25b.

The mating cylindrical surfaces on the slidehead 21 and on the slideway portions 15 insure that the slidehead is self-locating with respect to the slideway, i. e., shifted the correct amount to left or right as viewed in Fig. 7 for the slidehead to occupy a mid position with respect to the slidehead and the crankshaft portion 23; and that the slidehead is self-aligning with respect to the slideway, i. e., is angled properly in relation to the line of reciprocation along which the slidehead travels, which is transverse to the plane of Fig. 7.

The machine comprising the cylinder blocks 36 and 37, the heads 38 and 39, the crankshaft 24, and the multi-part piston structures directly mounted on the crankshaft 24 may be either a pump or an engine, depending on whether the crankshaft reciprocates the piston structures and they in turn pump fluid in and out of the cylinders or whether an explosive mixture admitted to the cylinders drives the piston structures and they in turn rotate the crankshaft.

It will be noted that all portions of my piston structure, including the means 17 and 26 for tieing the piston head portions 11 together, lie entirely within the cylinder bore 39' which is of a uniform bore and entirely within an axial projection of the piston head portions. The inner surface 41 of each projection 17 is formed convex in the direction of a plane normal to the axis of the piston structure at least in the region midway between the slideway surfaces 16 in order to provide sufficient metal to embed the bolts 26 and also to give the intermediate structure of the piston sufficient strength. In order to avoid interference mechanically with the crankshaft the oblique portions 23' of crankshaft 24 are concaved at 42 so that they will sweep with minimum clearance the surfaces 41 of the skirt projections 17 adjacent thereto during the mid-stroke of the piston structure. This arrangement is of advantage, in providing engine compactness and may be employed in connection with one-piece pistons as, for example, the Fig. 8 piston which is cast integrally without the bolts 26 and is preferably employed with a built-up crankshaft to facilitate assembly as hereinafter referred to.

In order to accommodate movement of the piston structure throughout its stroke without interference with the crankshaft and to provide for threading of the crankshaft through the piston structure, the latter is provided at each side of the slideway 15 with a slot or opening 40 elongated in the direction of the piston axis to receive the crankshaft journal portions 30, 31, and 32 adjacent the obliquely crank portions 23'. The diametrically disposed openings 40 are provided by the adjacent projections 17 at each side of slideway 15 and by the skirt, it being apparent that the slot 40 must extend to each side of plane 25 outwardly in the direction of the piston axis beyond the slideway portions of the piston parts 10. Each piston skirt 12 is provided with a set of piston rings 41a.

Referring now to Figs. 8 to 10, I have illustrated a modified type of piston structure which may be substituted for that previously referred to herein. This piston structure is formed as an integral or unitary casting and for convenience of assembly on a crankshaft structure the latter may be of the built-up type of which many forms are known in the art, one being illustrated in my copending application Serial No. 16,646, filed March 24, 1948.

This unitary piston structure has pressure heads 11' connected by an intermediate body tie portion or connecting structure 17' corresponding respectively with the aforesaid heads 11 and connecting structure 17 of the built-up, two-part, piston structure shown in Figures 1–7. However, in Fig. 8 the tie structure 17' comprises a unitary portion of the piston structure between skirt portions 12'. Webs or flanges 13" and 14' correspond generally to the aforesaid webs 13 and 14 and provide the X-brace support for the heads, skirt, and slideway portions 15 which are constructed just as aforesaid in connection with the two-part piston structure. Likewise the elongated slots 40' accommodate the crankshaft just as recited in connection with slots 40, these slots 40' being bounded on their sides by the pairs of ties 17' which are disposed adjacent the ends of the slideway 15 and which lie on the same side thereof.

In use, the piston structure of Figs. 8 to 10 functions just as hereinbefore set forth for the Fig. 7 assembly, it being understood that the slideway 15 will receive the aforesaid bearing block 21 in the same relationship with the crank portion of a crankshaft structure. The Fig. 8 piston structure likewise has all of its parts contained within a cylinder bore of uniform dimension throughout, in the interests of maximum simplicity, engine compactness, and economy of construction and operating costs.

Features of novelty not claimed but disclosed in this application are more fully disclosed and claimed in the copending applications of Alexander G. Herreshoff Serial No. 16,801, filed March 24, 1948, and John P. Butterfield Serial Nos. 16,645, 16,647, now Patent No. 2,571,198 issued October 16, 1951, 16,648, and 16,650, filed March 24, 1948.

I claim:

1. A piston structure having pressure faces at opposite ends and a tubular skirt portion connected therebetween having a transverse slideway formed within the intermediate region of the skirt portion, the piston structure being formed of a pair of mating parts each having one outer end forming a pressure face of the piston structure and the opposite inner end designed for engaging the corresponding opposite inner end of the other mating part, the slideway comprising opposed, concavely curved, bearing portions, one formed in each mating part, each mating part having a plurality of generally parallel passages extending from the said inner end thereof to a portion of the skirt spaced from the said outer end thereof and recesses formed in the skirt at the said portions of the skirt intersecting said passages, the passages in one mating part being generally aligned with the passages in the other mating part, a plurality of bolts each of which is positioned in an aligned set of the passages in the mating parts and each having threaded ends located in the recesses, and nuts engaging the threaded ends of the bolts and portions of the mating parts at the recesses for holding the mating parts together.

2. A piston structure comprising a pair of mating parts adapted to embrace a crank shaft, each mating part comprising a head, a skirt extending from the head, a pair of flanges within each part extending from the head in intersecting relation with one another from one side of the skirt to the other, a slideway portion within the piston having a curved bearing surface extending from one side of the skirt to the other along one flange in spaced relation to the head, the skirt having longitudinally extending projections at opposite sides of the ends of the slideway portion extending farther from the head than the slideway portion is spaced therefrom, the skirt projections having longitudinally extending passages therethrough, the skirt projections of one mating part abutting the skirt projections of the other mating part with the passages thereof generally aligned and the curved slideway bearing parts in facing, spaced, relation, and means positioned in the passages for holding the mating parts together.

3. A piston structure comprising a pair of mating parts adapted to embrace a crankshaft, each mating part comprising a head, a skirt extending from the head, a pair of stiffening flanges within each part extending from the head in intersecting relation with one another from one side of the skirt to the other, a slideway portion having a curved bearing surface extending from one side of the skirt to the other along one flange in spaced relation to the head, the skirt having longitudinally extending projections at opposite sides of the ends of the slideway portion extending farther from the head than the slideway portion is spaced therefrom, there being longitudinally extending passages through the projections terminating in regions of the skirt spaced from the head, recesses formed at the said regions of the skirt intersecting said passages, the skirt projections of one mating part abutting the skirt projections of the other mating part with the passages thereof generally aligned, and the slideway bearing portions in facing, spaced, relation, bolts positioned in the passages having threaded ends in the recesses, and nuts engaging the threaded ends and the mating parts to hold the latter together, the portions of the skirt projections adjacent said passages being enlarged to further stiffen the piston structure.

4. The piston structure specified in claim 3, regions of the skirt of each mating part at opposite sides of the middle of the slideway portion terminating a less distance from the head than the slideway portion, the flange intersecting the flange associated with the slideway portion increasing in depth from the said skirt regions to the slideway portion to correspond to the depth of said skirt regions and to the spacing of the slideway portion from the head.

5. A piston structure comprising a pressure head at each end thereof, a slideway within said structure having its axis extending transversely of the axis of the piston structure, said slideway comprising a pair of spaced, curved bearing surfaces each comprising a bearing surface having said slideway axis as its axis of curvature, and tie means connecting said heads and comprising a tension element embedded in said piston structure, and X-brace flanges within said structure extending between each pressure head and the slideway.

6. A piston structure comprising a pressure head at each end thereof, a slideway within said structure having its axis extending transversely of the axis of the piston structure, said slideway comprising a pair of opposed, curved bearing surfaces each comprising a bearing surface having said slideway axis as its axis of curvature, said piston structure including skirt portions having a pair of diametrically disposed crankshaft-receiving slots therein extending axially of the piston structure from an intermediate region thereof beyond said slideway whereby opposite ends of said slots are respectively disposed closer to said heads than said slideway bearing surfaces, and X-brace flanges within said structure extending between the heads and skirt portions and the slideway.

7. A piston structure of the character described comprising, in combination, a pressure head at each end of said piston structure, a slideway extending transversely of the axis of said piston structure, and an X-brace between each of said heads and said slideway, each of said X-braces comprising a pair of webs each being swept into merging relationship with said slideway, said slideway comprising a pair of bearing surfaces relatively spaced apart axially of the piston structure, said surfaces being formed as portions of a common cylinder.

8. A piston structure of the character described comprising, in combination, a pressure head at each end of said structure, said piston structure having an internal slideway extending therethrough on an axis normal to the axis of said piston structure, said slideway having curved bearing surfaces formed as portions of a cylinder having an axis coinciding with the slideway axis, and a pair of crankshaft-receiving, diametrically opposed, openings each disposed between the ends of said slideway in a direction circumferentially of said piston structure, said piston structure comprising a plurality of intermediate structural portions disposed between said heads in a direction axially of the piston structure, said intermediate portions being respectively disposed between said openings and the ends of said slideway in a direction circumferentially of said piston structure, said intermediate portions having outer cylinder-engageable cylindrical surfaces and inner surfaces convex in a plane normal to the axis of the piston structure containing the axis of said slideway, and means for securing said heads together including a plurality of tension members extending axially of said piston structure and respectively embedded in said intermediate portions.

9. A double ended piston structure having at each end a pressure head, a skirt portion extending between the pressure heads, a slideway portion within the skirt portion extending transverse to the axis of the piston structure, a pair of stiffening flanges within the piston structure extending from each head in intersecting relationship with one another and extending from one side of the skirt to the other, one flange of each pair extending along the slideway, curved bearing surfaces along the slideway formed as portions of a cylinder having its axis coincident with the axis of the slideway, and diametrically disposed crankshaft receiving slots formed in the skirt portion arranged at a distance spaced circumferentially from the ends of the slideway.

10. A double-ended piston structure having at each end a pressure head, a tubular skirt portion connecting the spaced pressure heads, axially extending, diametrically disposed, slots piercing the walls of said tubular skirt portion, a flange depending from the inner side of each pressure head arranged to extend diametrically across said skirt portion, a bearing block slideway supported by and aligned with each of the depending flanges throughout their length, said slideways being aligned with and spaced from each other with the opposed faces of the spaced slideways formed as sections of a single cylindrical surface, and additional flange means depending from each pressure head and arranged in intersecting relationship with respect to said first mentioned slideway supporting flanges intermediate the ends of the slideways, said additional flanges being connected to said slideways and adapted to stiffen the support for said slideways intermediate the ends thereof.

11. A piston structure comprising a pair of mating parts adapted to embrace a crankshaft, each mating part comprising a pressure head, and a tubular skirt portion depending from the pressure head, a pair of flanges within each skirt portion depending from the inner surface of the pressure head and arranged to extend axially of the skirt portion in intersecting relation with respect to one another, a slideway portion supported by said flanges arranged to extend from one side of the skirt to the other along one of the flanges in axially spaced relation to the pressure head, said slideway having a curved, axially extending, bearing face, the skirt having axially extending projections at opposite sides of the ends of the slideway portion extending farther in an axial direction from the pressure head than the slideway portion is spaced therefrom, passages in said projections extending lengthwise thereof, the skirt projections of one mating part abutting the skirt projections of the other mating part with the passages therein generally aligned and the slideways arranged in opposed, aligned, spaced relation, and means positioned in the passages for holding the mating parts together.

12. A piston structure comprising a pair of mating parts adapted to embrace a crankshaft, each mating part comprising a pressure head, and a tubular skirt portion depending from the pressure head, a pair of flanges within each skirt portion depending from the inner surface of the pressure head and arranged to extend axially of the skirt portion in intersecting relation with respect to one another, a slideway portion supported by said flanges arranged to extend from one side of the skirt to the other along one of the flanges in axially spaced relation to the pressure head, said slideway having a curved, axially extending, bearing face, the skirt having axially extending projections at opposite sides of the ends of the slideway portion extending farther in an axial direction from the pressure head than the slideway portion is spaced therefrom, passages in said projections extending lengthwise thereof, the skirt projections of one mating part abutting the skirt projections of the other mating part with the passages therein generally aligned and the slideways arranged in opposed, aligned, spaced relation, the opposed bearing faces of said slideway portions being formed as portions of the same cylindrical surface, and means positioned in the passages for holding the mating parts together.

13. A piston structure comprising a pair of mating parts adapted to embrace a crankshaft, each mating part comprising a pressure head, and a tubular skirt portion depending from the pressure head, a flange depending from the inner surface of the pressure head and arranged to extend axially of the skirt portion, a bearing block slideway portion supported by the flange arranged to extend diametrically of the skirt portion in axially spaced relationship to the pressure head, said slideway having a curved, axially extending, bearing face, the skirt having axially extending projections at opposite sides of the ends of the slideway portion extending farther in an axial direction from the pressure head than the slideway portion is spaced therefrom, passages in said projections extending lengthwise thereof, the skirt projections of one mating part abutting the skirt projections of the other mating part with the passages therein generally aligned and the slideways arranged in opposed, aligned, spaced relation, and means positioned in the passages for holding the mating parts together.

JOHN P. BUTTERFIELD.

REFERENCES CITED

The following references are of record in the file of this patent:

UNITED STATES PATENTS

| Number | Name | Date |
| --- | --- | --- |
| 695,824 | Motsinger | Mar. 18, 1902 |
| 870,559 | Hogan | Nov. 12, 1907 |
| 1,042,505 | Twombly | Oct. 29, 1912 |
| 1,710,721 | Bosmans | Apr. 30, 1929 |
| 2,143,586 | Walti | Jan. 10, 1939 |
| 2,200,199 | Bradfute, Jr. | May 7, 1940 |
| 2,404,906 | Heald | July 30, 1946 |

FOREIGN PATENTS

| Number | Country | Date |
| --- | --- | --- |
| 491,513 | France | Feb. 5, 1919 |